United States Patent [19]
Hanif et al.

[11] Patent Number: 5,966,545
[45] Date of Patent: Oct. 12, 1999

[54] SYSTEM FOR INTERFACING NETWORK APPLICATIONS WITH DIFFERENT VERSIONS OF A NETWORK PROTOCOL BY PROVIDING BASE CLASS AT SESSION LEVEL AND INVOKING SUBCLASS FROM BASE CLASS AT SESSION LEVEL

[75] Inventors: Mohammad Hanif, Fremont; Kazuhisa Yanagihara, Santa Cruz, both of Calif.

[73] Assignee: Apple Computer, Inc., Cupertino, Calif.

[21] Appl. No.: 08/591,858

[22] Filed: Jan. 25, 1996

[51] Int. Cl.⁶ .............................. G06F 13/14; G06F 15/16
[52] U.S. Cl. .................... 395/831; 395/500; 395/200.6; 395/285
[58] Field of Search ................................. 395/500, 200.6, 395/831, 600, 700, 285, 200.5; 370/389; 379/115

[56] References Cited

U.S. PATENT DOCUMENTS

| | | | |
|---|---|---|---|
| 4,855,905 | 8/1989 | Estrada et al. | 364/200 |
| 5,136,716 | 8/1992 | Harvey et al. | 395/800 |
| 5,526,488 | 6/1996 | Hershey et al. | 395/200.2 |
| 5,537,417 | 7/1996 | Sharma et al. | 370/94.1 |
| 5,546,584 | 8/1996 | Lundin et al. | 395/700 |
| 5,551,030 | 8/1996 | Linden et al. | 395/600 |
| 5,640,394 | 6/1997 | Schrier et al. | 370/389 |
| 5,640,446 | 6/1997 | Everett et al. | 379/115 |
| 5,696,899 | 12/1997 | Kalwitz | 395/200.1 |

OTHER PUBLICATIONS

Osher; 'Object Request Brokers'; BYTE; p. 172; vol. 17, No. 1, Jan. 1992.

*Primary Examiner*—Thomas C. Lee
*Assistant Examiner*—Rehana Perveen
*Attorney, Agent, or Firm*—Sawyer & Associates

[57] ABSTRACT

A system and method for allowing a network application to interface with both a first transaction protocol and a second transaction protocol. The system and method provides an object-oriented base class for use by the network application. A first subclass is invoked from the base class when the network application interfaces the first protocol, and a second subclass is invoked from the base class when the network application interfaces the second protocol. The network application is made compatible with the first protocol by invoking the first subclass, and made compatible with the second protocol by invoking the second subclass.

31 Claims, 7 Drawing Sheets

SYSTEM FOR INTERFACING NETWORK APPLICATIONS WITH DIFFERENT VERSIONS OF A NETWORK PROTOCOL BY PROVIDING BASE CLASS AT SESSION LEVEL AND INVOKING SUBCLASS FROM BASE CLASS AT SESSION LEVEL

FIELD OF THE INVENTION

The present invention relates generally to an apparatus and method for transferring data between a file server and a plurality of data processing devices. More particularly, the invention is directed to an application programming interface that facilitates the development of network applications on different versions of a network protocol.

BACKGROUND OF THE INVENTION

In the computing industry, it is quite common to transfer data and commands between a plurality of data processing devices, such as computers, printers, displays, terminals, and other network resources. Interconnection of computers and other peripheral devices principally developed in the early 1970's with the advent of computer networking systems which permitted the distribution of access to computing resources beyond the immediate proximity of a mainframe computer.

Recently, "local area networks" (LANs) have been developed which allow transfer of data between a localized set of computing and peripheral devices, typically in the same geographical area such as one building or a plurality of buildings closely situated together. Examples of such LANs may be found in U.S. Pat. Nos. 4,063,220, 4,661,902, and 4,689,786.

In the AppleTalk® (a trademark of Apple Computer, Inc.) network system, each "node" or computer, printer, peripheral, and other network resources share resources with a file server. The file server includes three main AppleTalk protocols called the AppleTalk Filing Protocol (AFP), AppleTalk Session Protocol (ASP), and the operating system of the file server includes the AppleTalk Transaction Protocol (ATP). The AFP is a protocol dealing with issues that are file system related, and the ASP is a protocol for maintaining network sessions between the file server and the network entities.

A session is opened once an entity establishes communication with the server, and the ASP keeps information about the entity in a session object. After a session is created, the AFP uses the ASP to receive file system requests from network entities and to send responses back to the entities. The request and responses may be partitioned into smaller data packets and the ASP uses the ATP to send and receive these data packets over the network.

The first version of AppleTalk is known as classic AppleTalk. The assignee of the present application has developed a succeeding version of AppleTalk called OpenTransport. Both classic AppleTalk and OpenTransport provide an application programming interface (API) that allows third party developers to write network applications on top of the AppleTalk and OpenTransport network protocols. Unfortunately, the API's supported by classic AppleTalk and OpenTransport are significantly different and incompatible. Therefore, third party developers cannot write native applications that directly utilize both classic AppleTalk and OpenTransport API's.

Accordingly, what is needed is an API that facilitates the development of network applications that transparently implements native access to both classic AppleTalk and with OpenTransport. The present invention addresses such a need.

SUMMARY OF THE INVENTION

The present invention provides a system and method for allowing a network application to interface with both a first protocol and a second protocol. The system and method first provides a base class for use by the network application. A first subclass is invoked from the base class when the network application interfaces the first protocol, and a second subclass is invoked from the base class when the network application interfaces the second protocol. The network application is made compatible with the first protocol when the first subclass is invoked, and made compatible with the second protocol when the second subclass is invoked.

According to the system and method disclosed herein, network applications may be written to work over only classic AppleTalk, or only OpenTransport, or both classic AppleTalk and OpenTransport at the same time.

DESCRIPTION OF THE INVENTION

The present invention relates to an improvement in a server utilized in a network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
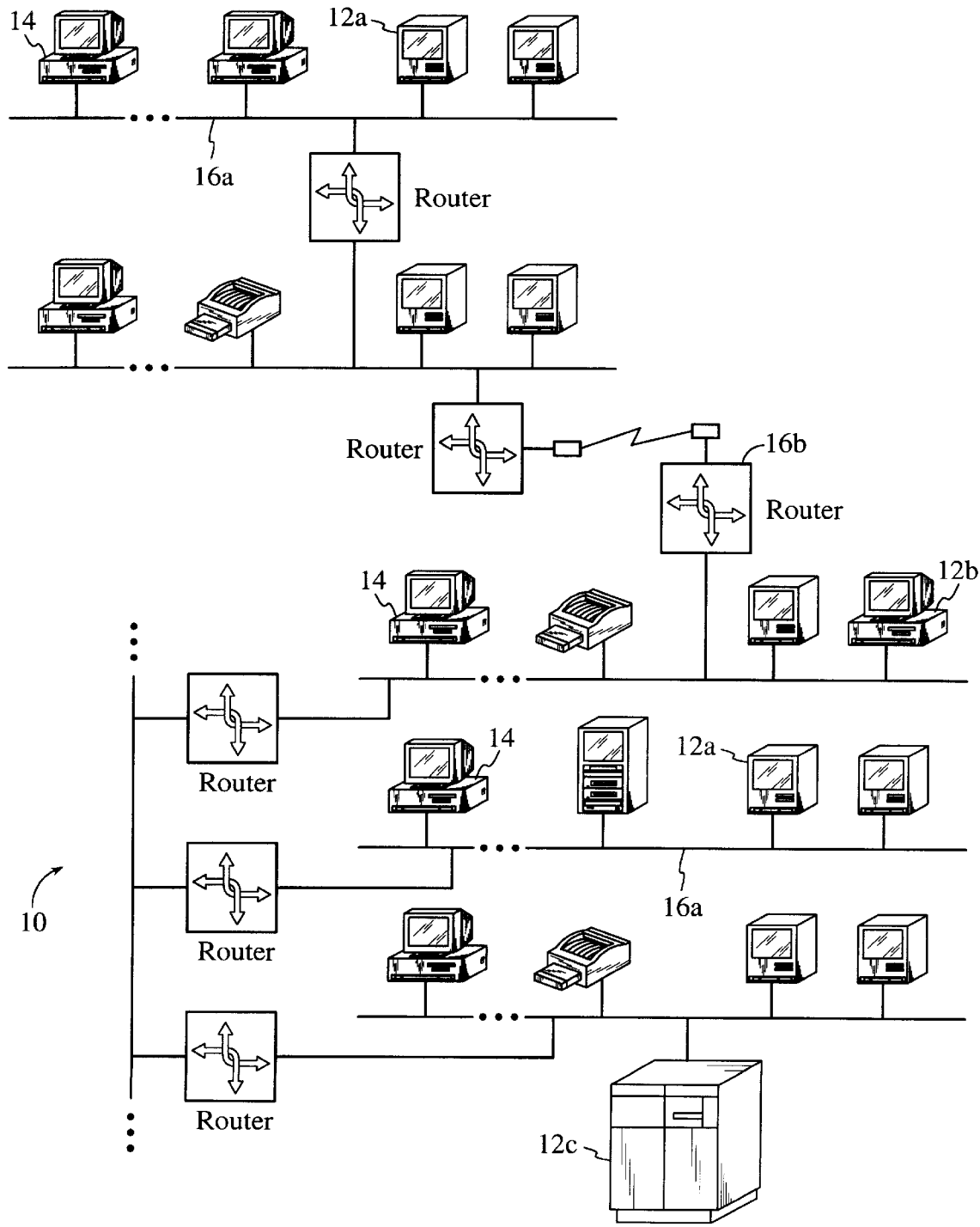
FIG. 1 is a block diagram illustrating a computer network system.

FIG. 1 is a block diagram illustrating a computer network environment in which the present invention resides. The network 10 may include a plurality of computers, such as personal computers 12a, minicomputers 12b, and mainframes 12c, and server devices 14, such as a file and printer servers. For the purposes of this specification, all data processing and peripheral devices which are coupled to the network are collectively referred to as entities 12. The entities 12 may be connected through a variety of network connection devices 16 such as cables 16a and routers 16b, for example. The purpose of the network 10 is to eliminate access barriers resulting from physical separation between the various entities 12 and to share the resources the entities 12 contain.

Figure 2:
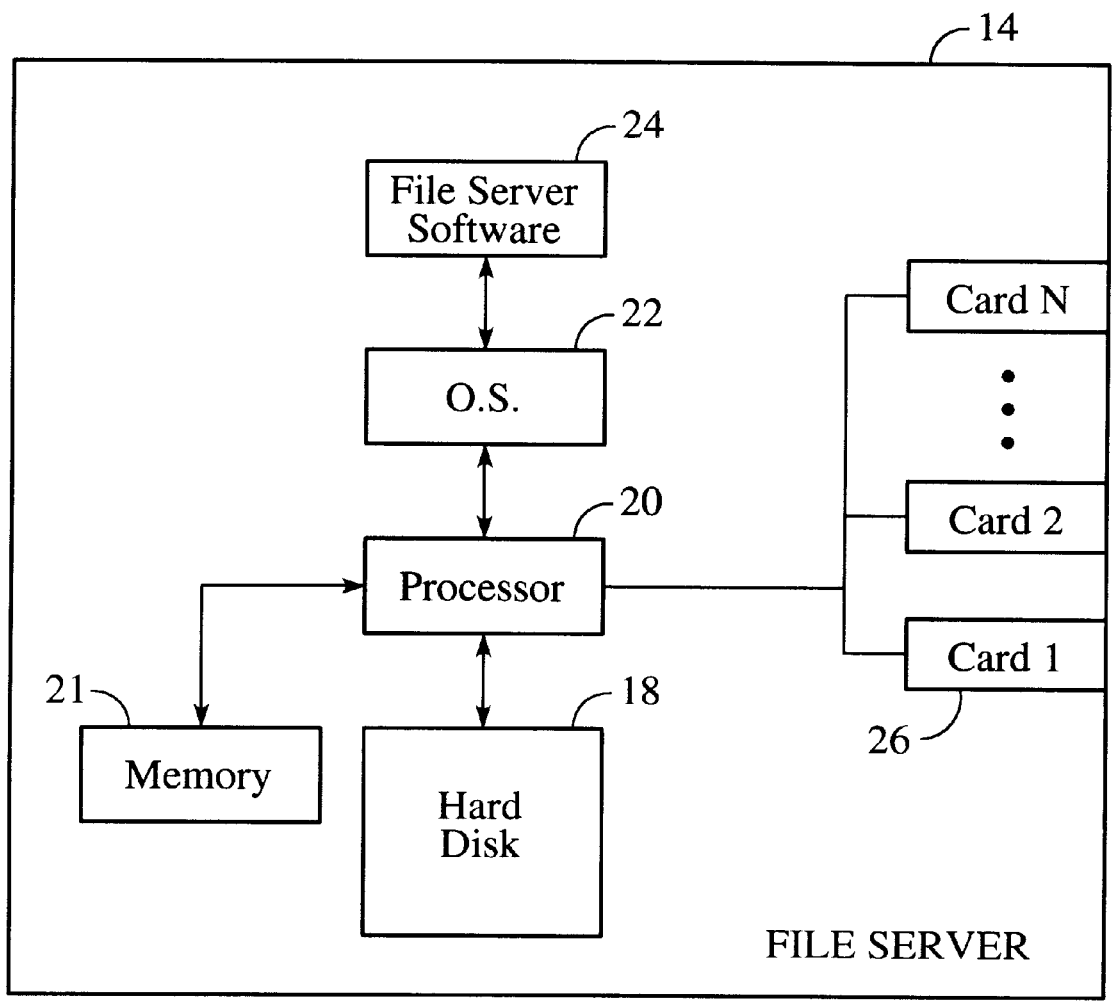
FIG. 2 is a block diagram of a server in which the present invention is implemented.

FIG. 2 is a block diagram of a server 14 in which the present invention is implemented. The server includes one or more hard disk drives 18, a processor 20, memory 21, an operating system 22, file server software 24, and one or more network interface cards 26. The file server software 24 enables a computer to become a file server 14 for one or more entities 12, on the network.

In a preferred embodiment, the file server software 24 is Appleshare File Server software, which utilizes a protocol architecture called AppleTalk. Both Appleshare and Apple-Talk were designed and developed by Apple Computer, Cupertino, Calif. Also in a preferred embodiment, the processor 20 is a PowerPC processor, and the operating system 22 is a Macintosh Operating System, such as System 7.5, for example.

Figure 3:
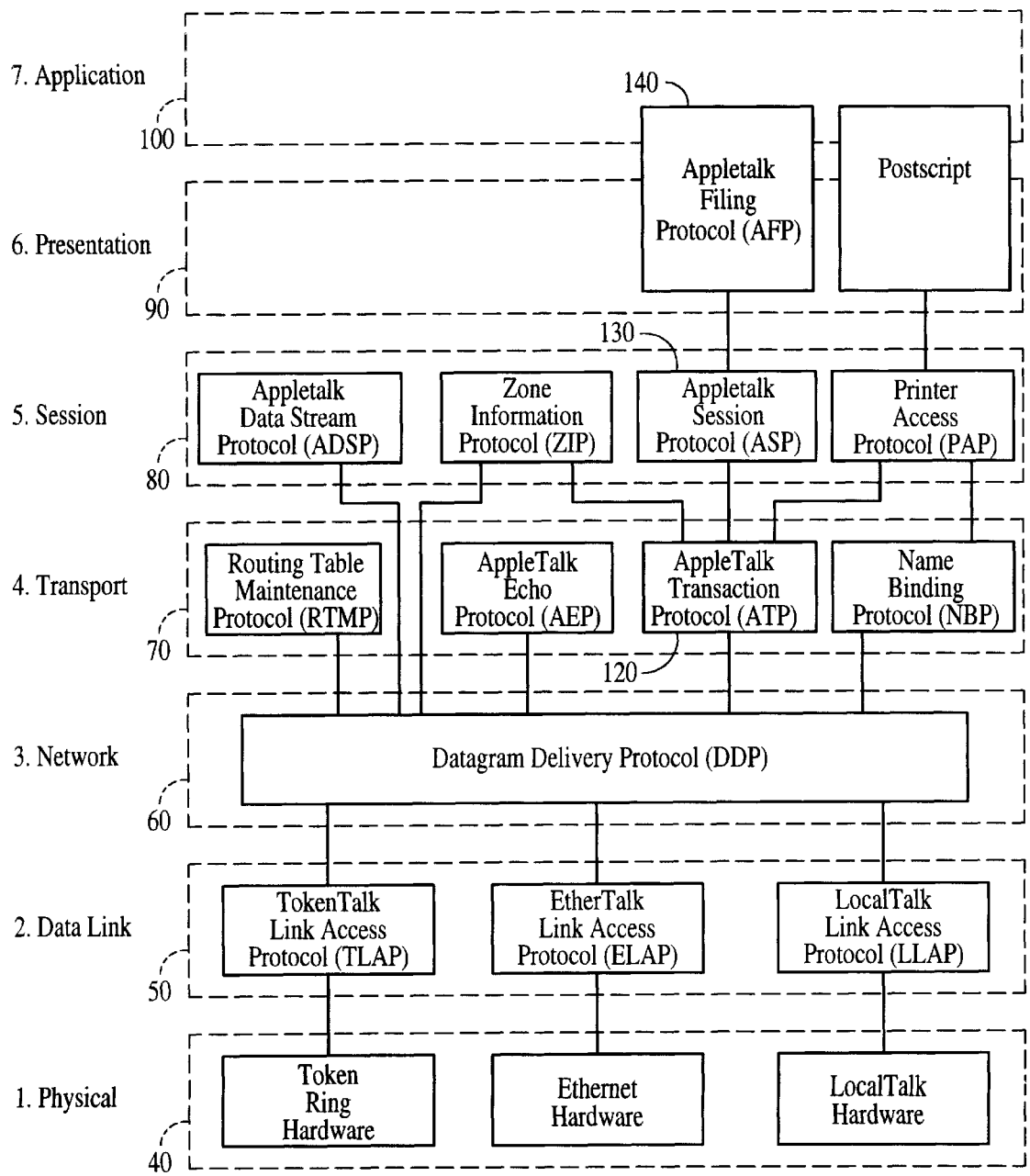
FIG. 3 is a diagram illustrating the AppleTalk protocol architecture within the framework of the Open Systems Interconnection (OSI) reference model.

Referring to FIG. 3, the AppleTalk protocol architecture is shown within the framework of the Open Systems Interconnection (OSI) reference model developed by the International Standards Organization (ISO). The OSI model defines the concepts of a protocol and a service interface that includes seven layers: Physical 40, Data Link 50, Network 60, Transport 70, Session 80, Presentation 90, and Application 100. The layers allow data packets to be transmitted from a variety of hardware to another, and from one process (socket) to another. Each layer functions as a separate process or filter that either appends protocol information onto existing data packets transmitted in the network 10, or routes appropriate data packets through the network 10 depending on the type of packet and the particular layer in which the packet resides.

Referring to both FIGS. 1 and 3, the higher-level network services in both OSI and AppleTalk are built using the model of an entity 12 issuing a sequence of commands to a server 14. The server 14 carries out the commands and then reports the results to the entity 12. The present invention relates to the interaction between the AppleTalk Session Protocol (ASP) 130 and the AppleTalk Filing Protocol (AFP) 140. The AppleTalk protocol is described in further detail in *Inside AppleTalk®*, by Gursharan Sidhu, Richard F. Andrews, and Alan B. Oppenheimer (2d Ed. 1990), published by Addision-Wesley, which is herein incorporated by reference.

The purpose of the AFP 140 is to allow the server to share files with the entities 12 on the network 10 through network commands. The ASP 130 serves the AFP 140 and is used to establish a connection, called a session, between an entity 12 and the server 14. A command from an entity 12 to a server 14 may require several data packets to be sent across the network 10. The AppleTalk Transaction Protocol (ATP) 120 provides the ASP 130 with a transaction service for sending and receiving packets across the network 10.

Typically, packets are sent and received between an entity 12 and the server 14, but packets may also be sent and received between software processes. Each entity 12 in the network 10 may include one or more software processes. One software process can request that another software process perform a higher-level function and then report the outcome. A software process that makes use of the services of another software process is called a client. This interaction between a requesting client and a responding client is called a transaction, and is handled by the ATP 120. For purposes of this discussion, when an entity 12 on the network initiates a transaction with the file server 14, the entity 12 is the requesting client and the file server 14 the responding client of ATP 120.

In order to send and receive transactions, a client must first create an addressable entity on the network called a socket. This is accomplished by both the requesting client and the responding server making a call to the ATP 120 to open a respective socket. The socket opened at the responding entity is called a transaction listening socket. Both the requesting client and the responding server can have multiple sockets for receiving/transmitting transactions, where each socket is identified by a socket number.

The requesting client initiates a transaction by issuing a call to the ATP 120 and supplying the parameters of the request. Once the transaction request packet is received by the socket of the responding server, the transaction request is serviced and the responding server returns a transaction response packet reporting the transaction outcome.

Before an entity 12 can send transaction requests to a server 14, a session must be established between them. Whereas the ATP 120 handles individual transactions, the ASP 130 establishes and maintains sessions between each entity 12 and the server 14. For the duration of the session, the entity 12 can send a sequence of commands to the server 14. The ASP 130 ensures that the commands are delivered without duplication in the same order as they were sent, and sends the results of the commands back to the entity 12.

As stated above, the first version of AppleTalk is known as classic AppleTalk and the replacement for classic Apple-Talk is called OpenTransport. Both the behavior and the rules of the protocol layers are the same in the two versions of the network protocols, but the implementation is different.

Figure 4:
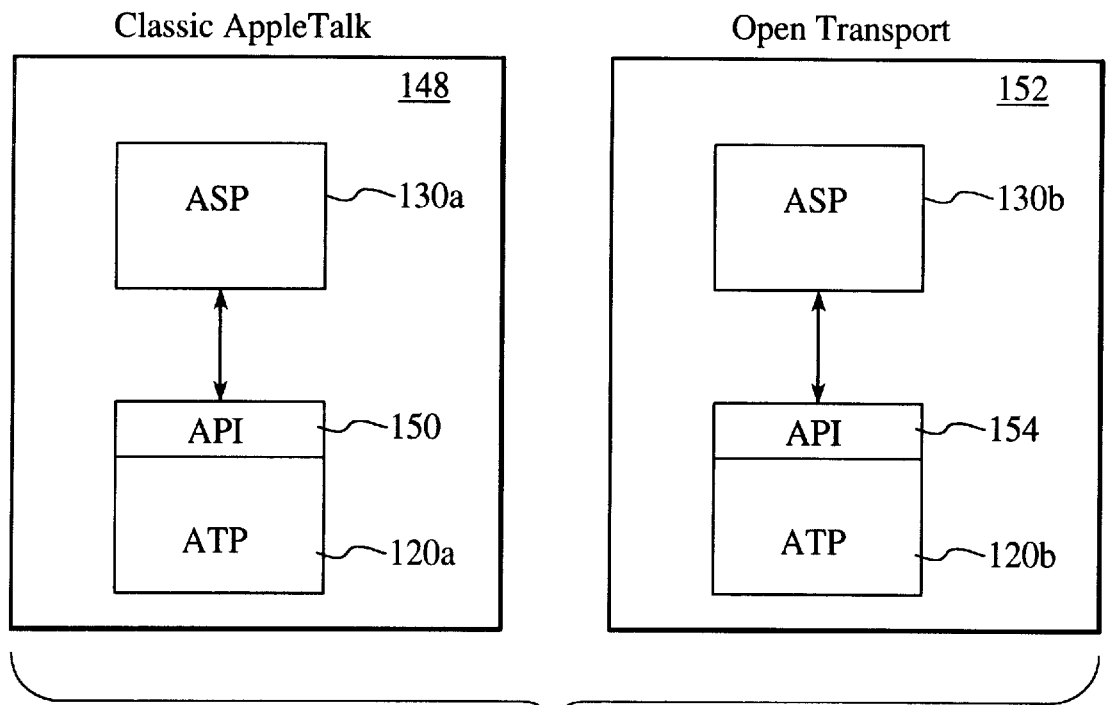
FIG. 4 is a block diagram illustrating the ASP and ATP layers in both classic AppleTalk and in OpenTransport.

Referring now to FIG. 4, a block diagram is shown illustrating the ASP and ATP layers in both classic AppleTalk 148 and in OpenTransport 152. The API 150 in classic AppleTalk 148 and the API 154 in OpenTransport 152 are both part of the ATP 120A and 120B, respectively. The APIs 150 and 154 are the mechanisms that provide entry points to the network protocols for application programs. The ASP 130A uses the API 150 to communicate with the upper layers of classic AppleTalk 148, and the ASP 130B uses the API 154 to communicate with the upper layers of OpenTransport 152.

The implementation, however, of the API 154 for Open-Transport 152 is different from implementation of the API 150 for classic AppleTalk 148. Therefore, ATP network applications developed for AppleTalk 148 are not able to run in native mode with the OpenTransport ASP 130B; and ATP network applications developed for OpenTransport 152 are not able to run in native mode with the AppleTalk ASP 130A. This incompatibility requires developers to write ATP network applications for either AppleTalk 148 or for Open-Transport 152, or to write two versions of the ATP application; one for classic AppleTalk 148 and one for OpenTransport 152.

The present invention is a method and system that facilitates the development of network applications on different versions of a network protocol. More specifically, the present invention facilitates the development of ATP network applications that can access both classic AppleTalk 148 and OpenTransport 152 in native mode. To more particularly illustrate the present invention, refer now to FIG. 5 depicting a block diagram of one embodiment of such a system.

Figure 5:
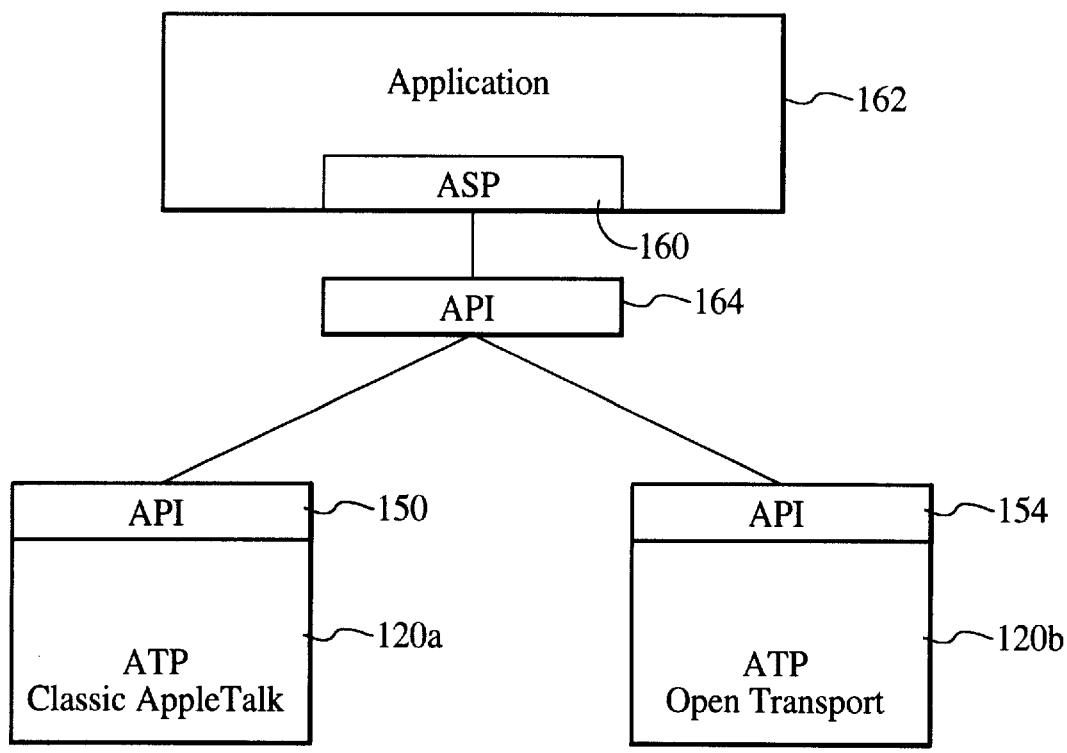
FIG. 5 is a block diagram illustrating an ASP layer of a network application that is compatible with both the ATP of classic AppleTalk and with the ATP of OpenTransport.

FIG. 5 is a block diagram illustrating an ASP layer 160 of a network application 162 that is compatible with both the ATP 120A of classic AppleTalk 148 and with the ATP 120B of OpenTransport 152. Since the AppleTalk API 150 and the OpenTransport API 154 are significantly different, the present invention provides an API 164 that acts a common interface between ASP 160 and the AppleTalk API 150 and the OpenTransport API 154. The API 164 facilitates the creation of applications that are compatible in both environments, as explained below.

The protocol layers in OpenTransport 152 are written as object oriented class structures in the C++ programming language. As is apparent to one with ordinary skill in the art, a class is an abstract description of both data and behavior of a collection of similar objects.

Figure 6A:
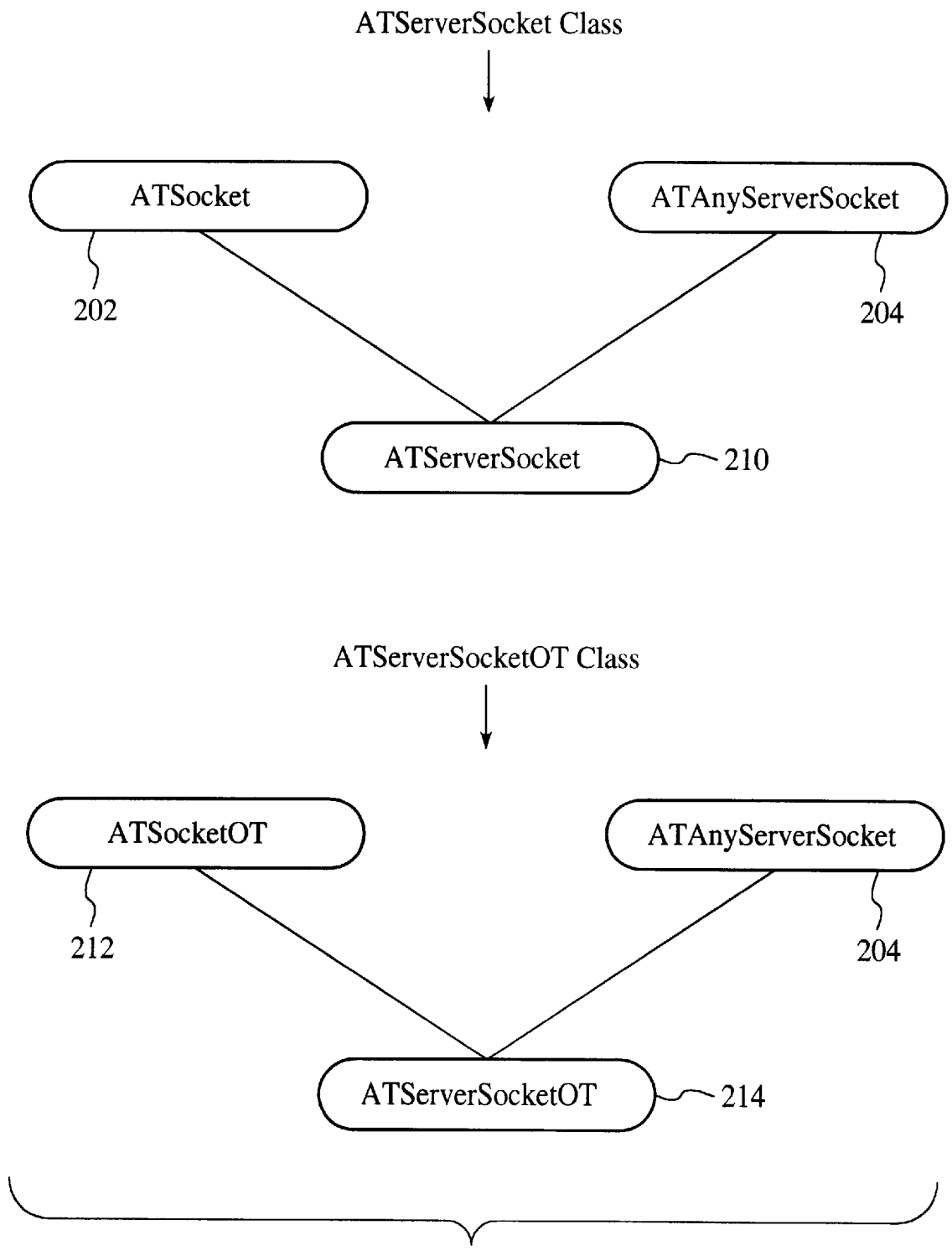
FIGS. 6A, 6B and 6C are functional block diagrams illustrating a set of ATSocket class structures that are used to implement the present invention.
Figure 6B:
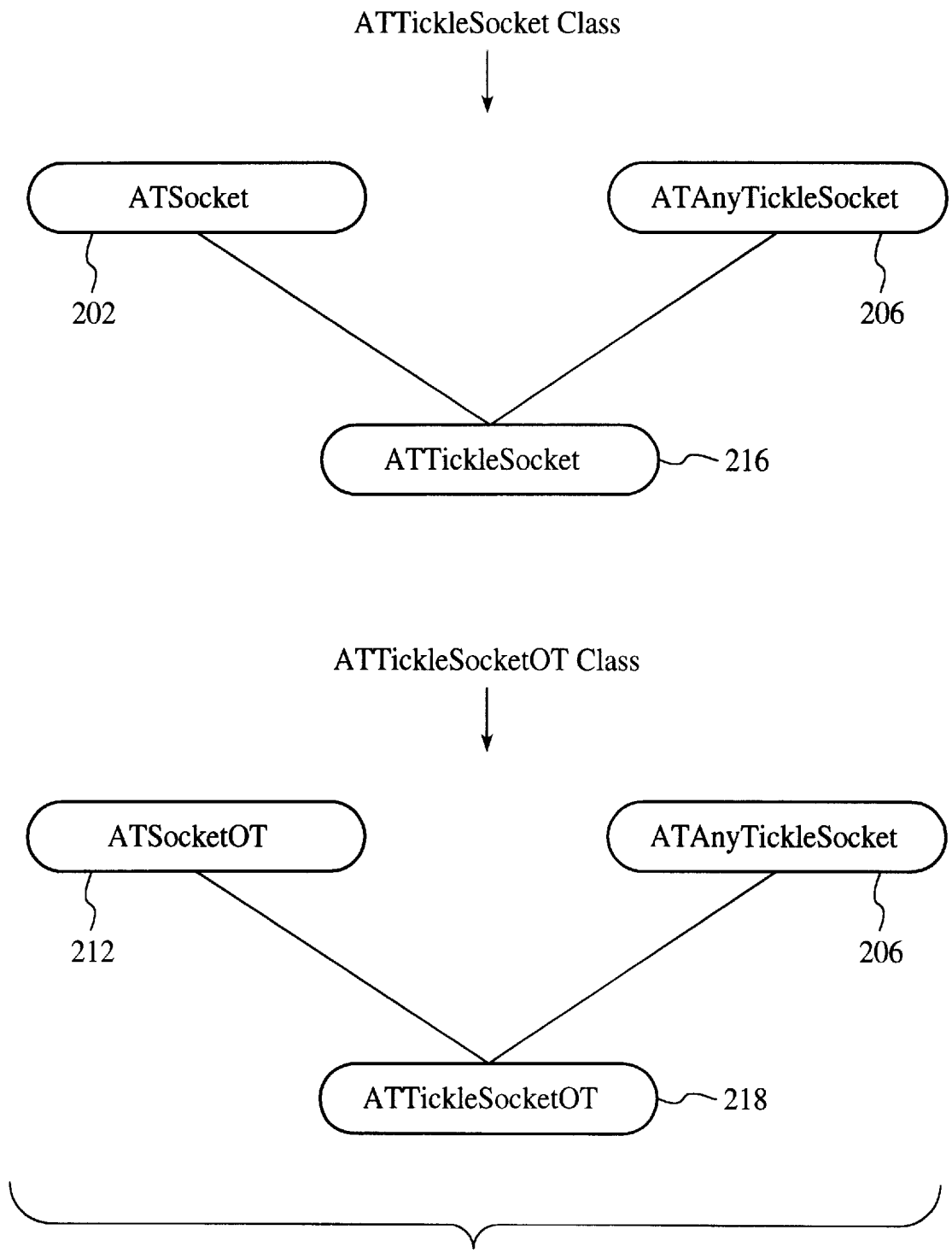
Figure 6C:
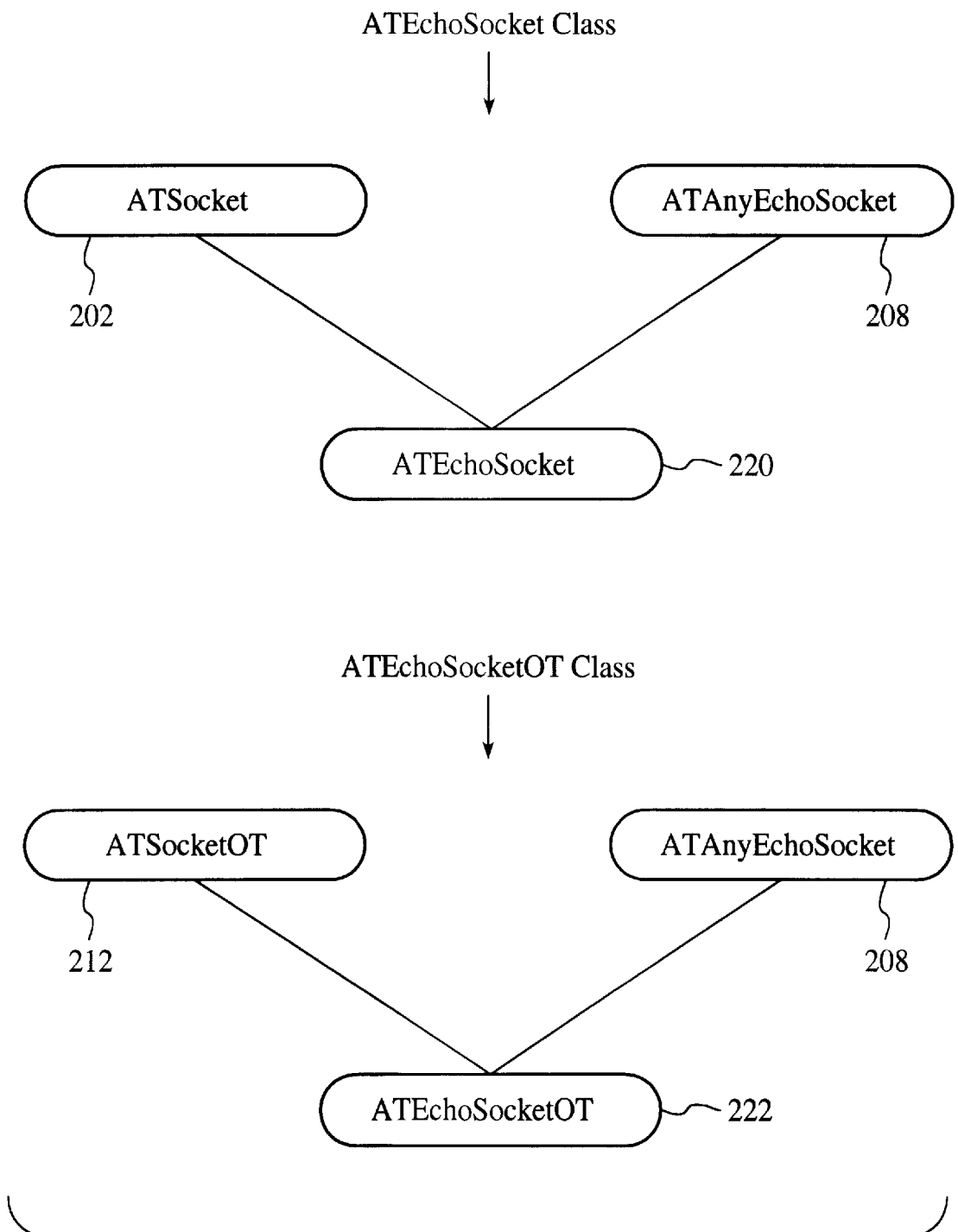

FIGS. 6A, 6B and 6C are functional block diagrams illustrating a set of ATSocket class structures that are used to implement the present invention. A main feature of object oriented programming is multiple inheritance, which allows a subclass to inherit data and behavior from more than one immediate base class.

In a preferred embodiment of the present invention, subclasses are created from the following base classes: ATSocket 202, ATSocket OT 212, ATAnyServerSocket 204, ATAnyTickleSocket 206, and ATAnyEchoSocket 208. Subclasses derived from these base classes define function and data members that are common to both classic AppleTalk 148 and OpenTransport 152 interfaces. Classes with the suffix "OT" implement OpenTransport 152 specific code.

Referring to FIG. 6A, the class hierarchy for a class called ATServerSocket is shown. The ATServerSocket class structures provides network applications with entry points to ATP 120 and include all the functions necessary to send, receive, and process requests.

For AppleTalk 148, the server subclass is ATServerSocket 210, which is inherited from the base classes ATSocket 202 and ATAnyServerSocket 204. For OpenTransport 152, the server subclass is ATServerSocketOT 214, which is inherited from both ATSocketOT 212 and ATAnyServerSocket 204.

Referring to FIG. 6B, the class hierarchy for a class called ATTickle is shown. The ATTickle class structures include maintenance functions that are performed periodically during an open session. For AppleTalk, the tickle subclass is ATTickleSocket 216, which is inherited from the base classes ATSocket 202 and ATAnyTickleSocket 206. The tickle subclass for OpenTransport is ATTickleSocketOT 218. ATTickleSocketOT 218 is inherited from both ATSocketOT 212 and ATAnyTickleSocket 206.

Referring to FIG. 6C, the class hierarchy for a class called ATEcho is shown. The ATEcho class structures include functions for receiving and replying to echo type data packets. For AppleTalk, the echo subclass is ATechoSocket 220, which is inherited from the base classes ATSocket 202 and ATAnyEchoSocket 208. The echo subclass for OpenTransport is ATEchoSocketOT 222. ATEchoSocketOT 222 is inherited from both ATSocketOT 212 and ATAnyEchoSocket 208.

Referring to FIG. 5 and FIGS. 6A–6C, one instance of the ASP 160 is created for either classic AppleTalk 148 or for OpenTransport 152 using the above object oriented classes. This allows applications to be created based on the availability of either classic AppleTalk 148 and OpenTransport 152.

Upon start-up, the file server 14, or other entity 12, checks a system variable to determine whether OpenTransport 152 has been installed. If OpenTransport 152 has been installed, then an object of ATServerSocketOT 214 is invoked and assigned to a variable within the class ATAnyServerSocket 204. If OpenTransport 152 has not been installed, then an object of ATServerSocket 210 for classic Appletalk 148 is invoked and assigned to the variable with the class ATAnyServerSocket 204.

At run-time, variables are bound to objects. Through the variable within ATAnyServerSocket 204, the ASP 160 is implemented as either OpenTransport 152 or classic AppleTalk 148 depending on which object was created.

An API 164 that facilitates the development of network applications on different versions of a network protocol has been disclosed in which applications written using the API 164 may choose to work over only classic AppleTalk 148, or only OpenTransport 152, or both classic AppleTalk 148 and OpenTransport 152 at the same time. Software written according to the present invention is intended to reside in some form of computer readable medium, such as memory or disk, or communicated via a network.

Although the present invention has been described in accordance with the embodiments shown in the figures, one of ordinary skill in the art recognizes there could be variations to the embodiments and those variations would be within the spirit and scope of the present invention. For example, one with ordinary skill in the art will recognize that the present invention is not limited to the AppleTalk protocol or the Macintosh file system, but rather can be implemented with any type of network protocol and any type of file system. Accordingly, many modifications may be made by one of ordinary skills in the art without departing from the spirit and scope of present invention, the scope of which is defined by the appended claims.

We claim:

1. A method for allowing a network application to interface with a first protocol and a second protocol, the first and second protocols residing on a file server, the method comprising the steps of:

(a) providing a base class residing on the file server at the session level of an Open Systems Interconnection (OSI) reference model for use by the network application;

(b) invoking a first subclass at the session level of the OSI reference model from the base class when interfacing the first protocol; and (c) invoking a second subclass at the session level of the OSI reference model from the base class when interfacing the second protocol, whereby invoking the first subclass makes the network application compatible with the first protocol, and invoking the second subclass makes the network application compatible with the second protocol.

2. A method as in claim 1 wherein step (b) further includes the step of:

(b1) providing the first subclass with a first server subclass that includes functions necessary to send, receive, and process requests for the first protocol.

3. A method as in claim 2 wherein step (c) further includes the step of:

(c1) providing the second subclass with a second server subclass that includes functions necessary to send, receive, and process requests for the second protocol.

4. A method as in claim 1 wherein step (b) further includes the step of:

(b1) providing the first subclass with a first tickle class that includes maintenance functions.

5. A method as in claim 4 wherein step (c) further includes the step of:

(c1) providing the second subclass with a second tickle class that includes maintenance functions.

6. A method as in claim 1 wherein step (b) further includes the step of:

(b1) providing the first subclass with a first echo class that includes functions for receiving and replying to echo data packets.

7. A method as in claim 6 wherein step (c) further includes the step of:
(c1) providing the second subclass with a second echo class that includes functions for receiving and replying to echo data packets.

8. A method as in claim 1 wherein the first protocol is a first transaction protocol.

9. A method as in claim 8 wherein the second protocol is a second transaction protocol.

10. A file server that facilitates the development of a network protocol that is compatible with both a first protocol and a second protocol, the first and second protocol residing on the file server, the file server comprising:
a base class residing on the file server at the session level of an Open Systems Interconnection (OSI) reference model for use by the network application;
means for invoking a first subclass at the session level of the OSI reference model from the base class when interfacing the first protocol; and
means for invoking a second subclass at the session level of the OSI reference model from the base class when interfacing the second protocol,
whereby invoking the first subclass makes the network application compatible with the first protocol, and invoking the second subclass makes the network application compatible with the second protocol.

11. A file server as in claim 10 wherein the first subclass further includes a first server class that includes functions necessary to send, receive, and process requests for the first protocol.

12. A file server as in claim 11 wherein the first subclass further includes a first tickle class that includes maintenance functions.

13. A file server as in claim 12 wherein the first subclass further includes a first echo class that includes functions for receiving and replying to echo data packets.

14. A file server as in claim 13 wherein the second subclass further includes a second server subclass that includes functions necessary to send, receive, and process requests for the second protocol.

15. A file server as in claim 14 wherein the second subclass further includes a second tickle class that includes maintenance functions.

16. A file server as in claim 15 wherein the second subclass further includes a second echo class that includes functions for receiving and replying to echo data packets.

17. A file server as in claims 10 and 16 wherein the network application includes an ASP layer, and the base classes are used by the ASP layer.

18. A file server as in claim 17 wherein the first protocol is a first transaction protocol.

19. A file server as in claim 18 wherein the second protocol is a second transaction protocol.

20. A file server as in claim 19 wherein the first transaction protocol is a layer in classic AppleTalk.

21. A file server as in claim 20 wherein the second protocol is a layer in OpenTransport.

22. A computer-readable medium containing program instructions for allowing a network application to interface with both a first protocol and a second protocol, the program instructions residing on a file server, the program instructions for:
(a) providing a base class residing on the file server at the session level of an Open Systems Interconnection (OSI) reference model for use by the network application;

(b) invoking a first subclass at the session level of the OSI reference model from the base class when interfacing the first protocol; and
(c) invoking a second subclass at the session level of the OSI reference model from the base class when interfacing the second protocol,
whereby invoking the first subclass makes the network application compatible with the first protocol, and invoking the second subclass makes the network application compatible with the second protocol.

23. A computer-readable medium as in claim 22 wherein instruction (b) further includes an instruction for:
(b1) providing the first subclass with a first server subclass that includes functions necessary to send, receive, and process requests for the first protocol.

24. A computer-readable medium as in claim 23 wherein instruction (c) further includes an instruction for:
(c1) providing the second subclass with a second server subclass that includes functions necessary to send, receive, and process requests for the second protocol.

25. A computer-readable medium as in claim 22 wherein instruction (b) further includes an instruction for:
(b1) providing the first subclass with a first tickle class that includes maintenance functions.

26. A computer-readable medium as in claim 25 wherein instruction (c) further includes an instruction for:
(c1) providing the second subclass with a second tickle class that includes maintenance functions.

27. A computer-readable medium as in claim 22 wherein instruction (b) further includes an instruction for:
(b1) providing the first subclass with a first echo class that includes functions for receiving and replying to echo data packets.

28. A computer-readable medium as in claim 27 wherein instruction (c) further includes an instruction for:
(c1) providing the second subclass with a second echo class that includes functions for receiving and replying to echo data packets.

29. A computer-readable medium as in claim 22 wherein the first protocol is a first transaction protocol.

30. A computer-readable medium as in claim 29 wherein the second protocol is a second transaction protocol.

31. A file server that facilitates the development of a network protocol that is compatible with both a first protocol and a second protocol, the first and second protocol residing on the file server, the file server comprising:
a base class residing on the file server at the session level of an Open Systems Interconnection (OSI) reference model for use by the network application, wherein the network application includes an ASP layer at the session level of the OSI reference model, and wherein the base classes are used by the ASP layer;
means for invoking a first subclass at the session level of the OSI reference model from the base class when interfacing the first protocol, wherein the first protocol is a first transaction protocol, wherein the first transaction protocol is a layer of classic AppleTalk, and wherein the first subclass includes
a first server class that includes functions necessary to send, receive, and process requests for the first protocol,
a first tickle class that includes maintenance functions, and
a first echo class that includes functions for receiving and replying to echo data packets; and means for invoking a second subclass at the session level of the OSI reference model from the base class when interfacing the second protocol, wherein the second protocol is a second transaction protocol, wherein the second transaction protocol is a layer in OpenTransport, and wherein the second subclass includes
    a second server subclass that includes functions necessary to send, receive, and process requests for the second protocol,
    a second tickle class that includes maintenance functions,
    a second echo class that includes functions for receiving and replying to echo data packets, and
whereby invoking the first subclass makes the network application compatible with the first protocol, and invoking the second subclass makes the network application compatible with the second protocol.

\* \* \* \* \*